United States Patent
Millar

(10) Patent No.: US 10,492,375 B2
(45) Date of Patent: *Dec. 3, 2019

(54) SYSTEMS AND METHODS FOR PROVIDING GROW LIGHTING

(71) Applicant: Grow Solutions Tech LLC, Lehi, UT (US)

(72) Inventor: Gary Bret Millar, Highland, UT (US)

(73) Assignee: GROW SOLUTIONS TECH LLC, Vineyard, UT (US)

(*) Notice: Subject to any disclaimer, the term of this patent is extended or adjusted under 35 U.S.C. 154(b) by 267 days.

This patent is subject to a terminal disclaimer.

(21) Appl. No.: 14/832,800

(22) Filed: Aug. 21, 2015

(65) Prior Publication Data

US 2016/0198638 A1 Jul. 14, 2016

Related U.S. Application Data

(60) Provisional application No. 62/124,987, filed on Jan. 9, 2015.

(51) Int. Cl.
| | |
|---|---|
| *A01G 7/04* | (2006.01) |
| *A01G 9/26* | (2006.01) |
| *H05B 37/02* | (2006.01) |
| *H05B 33/08* | (2006.01) |
| *A01G 9/24* | (2006.01) |
| *H05B 41/44* | (2006.01) |

(52) U.S. Cl.
CPC .............. *A01G 7/045* (2013.01); *A01G 9/249* (2019.05); *A01G 9/26* (2013.01); *H05B 33/086* (2013.01); *H05B 33/0863* (2013.01); *H05B 33/0872* (2013.01); *H05B 37/029* (2013.01); *H05B 37/0227* (2013.01); *H05B 37/0281* (2013.01); *H05B 41/44* (2013.01); *Y02B 20/42* (2013.01); *Y02P 60/146* (2015.11); *Y02P 60/149* (2015.11)

(58) Field of Classification Search
CPC . A01G 7/00; A01G 7/04; A01G 7/045; A01G 9/20; A01G 9/26; A01G 9/249
USPC .................................. 47/1.01 R, 17, 58.1 LS
See application file for complete search history.

(56) References Cited

U.S. PATENT DOCUMENTS

| | | |
|---|---|---|
| 5,012,609 A | 5/1991 | Ignatius et al. |
| 7,033,060 B2 | 4/2006 | Dubuc |
| 8,847,514 B1 | 9/2014 | Reynoso et al. |
| 2005/0178058 A1 | 8/2005 | Rudolph |

(Continued)

OTHER PUBLICATIONS

Office Action pertaining U.S. Appl. No. 14/832,806 dated Sep. 5, 2017.

(Continued)

*Primary Examiner* — David J Parsley
(74) *Attorney, Agent, or Firm* — Dinsmore & Shohl LLP

(57) ABSTRACT

Systems and methods for providing grow lighting are described. One embodiment of a method includes receiving a lighting cycle for a predetermined plant type and receiving a command for implementing the lighting cycle with a grow lighting assembly on a plant, where the grow lighting assembly includes a grow lighting device with a plurality of light emitting diodes (LEDs). Some embodiments also include determining an illumination pattern for implementing the lighting cycle for the grow lighting assembly and sending the illumination pattern to the grow lighting assembly for implementation.

19 Claims, 11 Drawing Sheets

(56) References Cited

U.S. PATENT DOCUMENTS

| | | | |
|---|---|---|---|
| 2010/0020536 A1* | 1/2010 | Bafetti | F21V 23/003 362/231 |
| 2013/0139437 A1* | 6/2013 | Maxik | H05B 37/02 47/58.1 LS |
| 2013/0283683 A1 | 10/2013 | Ringbom | |
| 2014/0250778 A1 | 9/2014 | Suntych | |
| 2014/0259920 A1 | 9/2014 | Wilson | |
| 2015/0351325 A1* | 12/2015 | Shelor | A01G 7/045 47/58.1 LS |

OTHER PUBLICATIONS

Office Action pertaining to U.S. Appl. No. 14/832,806 dated Dec. 27, 2017.

\* cited by examiner

SYSTEMS AND METHODS FOR PROVIDING GROW LIGHTING

CROSS REFERENCE

This application claims the benefit of U.S. Provisional Application Ser. No. 61/124,987, filed Jan. 9, 2015, which is hereby incorporated by reference in its entirety. This application is also related to U.S. application Ser. No. 14/832,806, entitled Systems and Methods for Creating a Grow Cycle, filed on the same day as this application, which is also hereby incorporated by reference in its entirety.

TECHNICAL FIELD

Embodiments described herein generally relate to systems and methods for providing grow lighting and, more specifically, to providing low heat photon-emitting lighting that provides a plurality of wavelengths to increase plant growth.

BACKGROUND

Many plants have evolved to grow in certain conditions and, as such, many current grow lights are not capable of growing these types of plants indoors. As an example, certain plants may only grow in a certain region of the world. Because other regions of the world have different conditions, these plants are not easily transported for growing elsewhere. While some plants may successfully grow in pots with the right soil, other plants may require a particular type of lighting in order to grow.

SUMMARY

Systems and methods for providing grow lighting are described. One embodiment of a method includes receiving a lighting cycle for a predetermined plant type and receiving a command for implementing the lighting cycle with a grow lighting assembly on a plant, where the grow lighting assembly includes a grow lighting device with a plurality of light emitting diodes (LEDs) and/or waves within the electromagnetic spectrum. Some embodiments also include determining an illumination pattern for implementing the lighting cycle for the grow lighting assembly and sending the illumination pattern to the grow lighting assembly for implementation.

In another embodiment, a system for providing grow lighting includes a grow lighting assembly that includes a plurality of low heat lighting elements, where a first lighting element of the plurality of low heat lighting elements outputs a first wavelength of photon-emitting light, and where a second lighting element of the plurality of low heat lighting elements outputs a second wavelength of photon-emitting light. The system may also include a computing device that stores logic that, when executed by the computing device, causes the system to receive a lighting cycle for a predetermined plant type, receive a command for implementing the lighting cycle with the grow lighting assembly on a plant, and determine an illumination pattern for implementing the lighting cycle for the grow lighting assembly. In some embodiments, the logic may cause the system to send the illumination pattern to the grow lighting assembly for implementation, where the grow lighting assembly implements the illumination pattern.

In yet another embodiment, a non-transitory computer-readable medium for providing grow lighting stores logic that, when executed by a computing device, causes the computing device to receive a lighting cycle for a predetermined plant type, receive a command for implementing the lighting cycle with a grow lighting assembly on a plant, where the grow lighting assembly includes a grow lighting device with a plurality of light emitting diodes (LEDs), where a first LED of the plurality of LEDs emits photon-emitting light of a first wavelength, where a second LED of the plurality of LEDs emits photon-emitting light of a second wavelength, and where the first wavelength and the second wavelength are different. The logic may further cause the computing device to determine an illumination pattern for implementing the lighting cycle for the first LED and the second LED and send the illumination pattern to the grow lighting assembly for implementation.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for providing grow lighting. Some embodiments may be configured with a lighting device that provides a plurality of different lighting wavelengths of grow lighting. The grow lighting is configured to emit photons that facilitate growth in various plants. Accordingly, embodiments described herein may be configured to determine a lighting cycle, where the lighting cycle includes a plurality of different lighting wavelengths (such as nanometer-scale wavelengths) emitted at different times. As an example, a first lighting element (such as a first LED) may provide a first wavelength of photon-emitting light, and a second lighting element (such as a second LED) may provide a second wavelength of photon-emitting light. In some embodiments, the first lighting element illuminates at a different time than the second lighting element. The lighting cycle may depend on the particular type of plants being grown and the developmental stage of the plant.

As an example, tomato plants may optimally grow with a first predetermined cycle, while basil may grow with a second predetermined cycle. The first predetermined cycle may include a first wavelength of light during the initial stages of development to optimize stem growth and a second wavelength of light at later stages of development to optimize fruit growth. Similarly, some plants may optimally grow with different light wavelengths at different times of day. Accordingly, embodiments described herein may provide a computing infrastructure for creating and utilizing these cycles for optimizing growth of different plants in a controlled environment. The systems and methods for providing grow lighting incorporating the same will be described in more detail, below.

Figure 1:
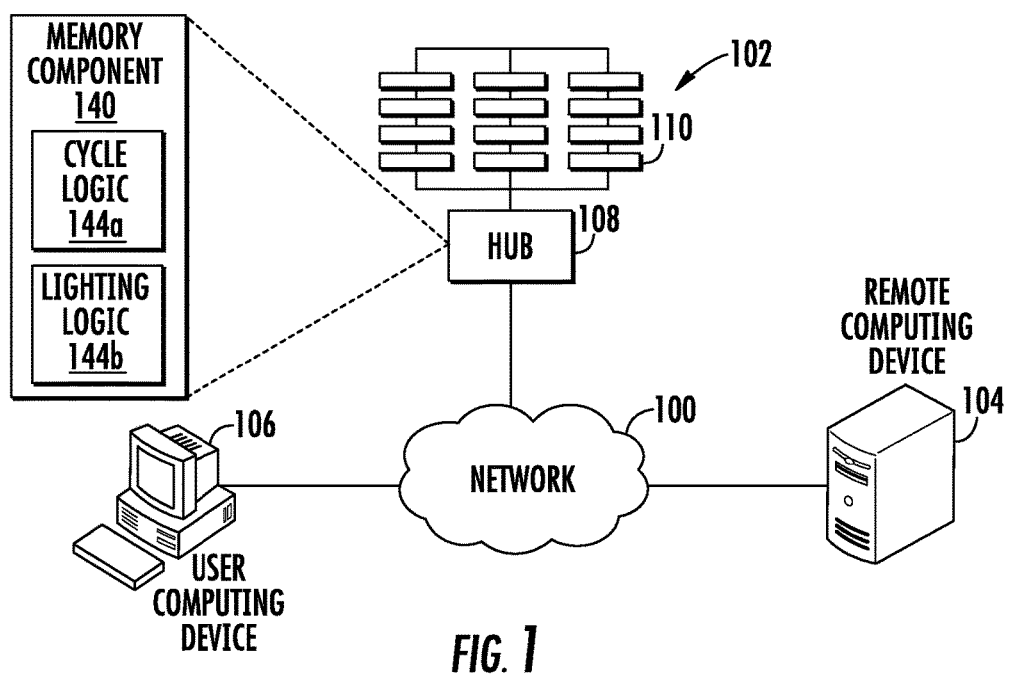
FIG. 1 depicts a computing environment for providing grow lighting, according to embodiments described herein.

Referring now to the drawings, FIG. 1 depicts a computing environment for providing grow lighting, according to embodiments described herein. As illustrated, the computing environment may include a network 100, a grow lighting assembly 102, a remote computing device 104, and a user computing device 106. The network 100 may include any wide area network, such as the internet, a mobile communication network, a public switch telephone network (PSTN), and the like. Similarly, the network 100 may include a local area network, which may include devices for communicating one or more various protocols, such as Ethernet, wireless fidelity (WiFi), Bluetooth™, near field communication, etc.

The grow lighting assembly 102 may include at least one hub device 108 and at least one grow lighting device 110. The hub may include a memory component 140, which stores cycle logic 144a and lighting logic 144b. As discussed in more detail below, the grow lighting device 110 may include a low heat lighting element (or a plurality of low heat lighting elements), which may be embodied as a light emitting diode (LED), cold cathode fluorescent lamp (CCFL), and/or other low heat lighting device, so long as the low heat lighting element is configured for outputting photon-emitting light to facilitate plant growth. The grow lighting device 110 may include a plurality of different LEDs, each of which is specifically tuned to output a particular wavelength of photon-emitting light. In operation, the hub device 108 may receive a grow cycle, which may be deciphered via the cycle logic 144a. The lighting logic 144b may then facilitate commands of the grow lighting device 110 to provide the desired lighting output for the plants being grown, as described in more detail below.

Depending on the particular embodiment, the grow lighting assembly 102 may include one or more positioning devices for raising and/or lowering the grow lighting devices 110 relative to the plants being grown. Similarly, watering devices, fertilizing devices, light filtering devices, light sensing devices, and/or other devices for further facilitating growth of the plants may be included with the grow lighting assembly 102 and may be controlled by the hub device 108, the remote computing device 104 and/or the user computing device 106. Depending on the particular embodiment, one or more sensors (such as a camera, proximity sensor, laser, etc.) may be utilized to determine the height and/or development of the plant such that the positioning device may automatically adjust to provide the desired distance between the grow lighting device 110 and the plant. While the grow lighting assembly 102 may be configured for outdoor operation, oftentimes, indoor operation may be desired to fully control lighting and other environmental conditions for the plants.

Additionally, the remote computing device 104 and the user computing device 106 may be configured for providing at least one user interface to receive grow cycle cycles from a user, as well as for implementing the grow cycle for a particular grow lighting assembly 102. In one embodiment, the user computing device 106 may be utilized by a creating user for creating a grow cycle, which is received and stored by the remote computing device 104. The user computing device 106 (and/or another computing device) may then provide a command for implementing the grow cycle on the grow lighting assembly 102. The remote computing device 104 may then send the cycle to the hub device 108 for implementation. The hub device may receive the cycle and determine the illumination pattern for implementing the grow cycle. The illumination pattern may include timing for providing power to one or more of the low heat lighting elements to achieve the grow cycle.

It should be understood that the embodiment depicted in FIG. 1 is merely an example. In some embodiments, the hub device 108 may be part of the user computing device 106. Similarly, some embodiments may be configured such that the user computing device 106 communicates to the hub device 108 and the lighting assembly 102 without use of the remote computing device 104. Other communication configurations that provide the described functionality are also contemplated.

Figure 2:
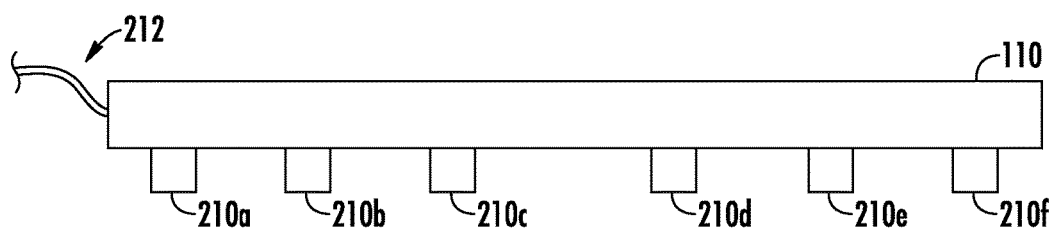
FIG. 2 depicts a grow lighting device, according to embodiments described herein.

FIG. 2 depicts a grow lighting device 110, according to embodiments described herein. As illustrated, the grow lighting device 110 may include circuitry to illuminate a plurality of LEDs 210a, 210b, 210c, 210d, 210e, 210f. Depending on the particular embedment, the grow lighting device may include a processor, which runs store commands based on information from the remote computing device 104, the user computing device 106, and/or the hub 108. Accordingly, the grow lighting device may include software and/or other logic that utilizes wave-based technology for reducing heat and other undesirable bi-products of the lighting device. Also depending on the particular embodiment, the LEDs 210 may be the same color or at least a portion of the LEDs 210 may be different colors to provide different photon-emitting lighting wavelengths. As an example, the LEDs 210a, 210b may output a red wavelength of light. The LEDs 210c, 210d may output a blue wavelength. The LEDs 210e, 210f may output a yellow wavelength. Some embodiments may be configured with each of the LEDs 210 a different color, and/or with colors beyond the primary colors, such as warm white, cool white, orange, green, violet, black, etc.

It should be understood that each (or at least a portion) of the LEDs 210 may be independent in that they may be illuminated with or without other LEDs on the grow lighting device 110. Additionally included is a communication interface 212, which may take the form of a power cable, an Ethernet cable, and/or other interface for providing power to the grow lighting device 110, as well as instructions on the lighting cycle for the grow lighting device 110. In some embodiments, the grow lighting device 110 may be hardwired for illumination as instructed by the hub device 108. Other embodiments of the grow lighting device 110 may be configured with hardware and/or software for receiving an instruction from the hub device 108 and controlling illumination of the LEDs.

It should also be understood that by using low heat lighting elements, such as LEDs 210, the photon-emitting light may be produced with little to no heat. As a consequence, the grow lighting device 110 may be positioned at a place relative to a plant that maximizes optimal growth without the risk of burning the plant with heat from the grow lighting device 110. Additionally, cooling of a grow room that includes grow lighting devices 110 may be unnecessary because of the minimal amount of heat produced by the grow lighting devices 110. Additionally, while the grow lighting device 110 of FIG. 2 is depicted with six LEDs, this is also an example. Depending on the embodiment, the grow lighting device 110 may include as few as one low heat lighting element or as many has hundreds of low heat lighting elements to provide the desired illumination.

Figure 3:
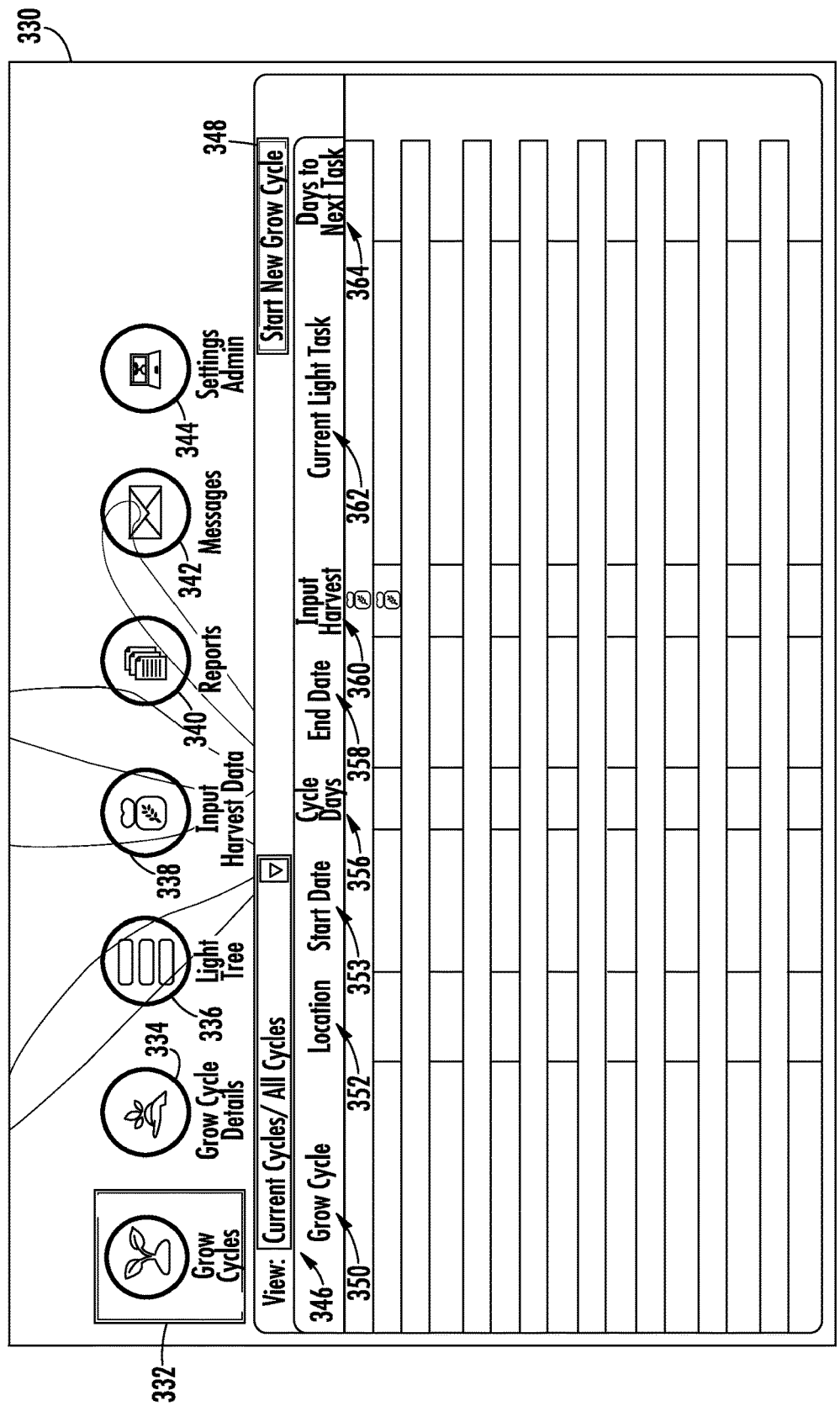
FIG. 3 depicts a user interface for creating a new grow cycle, according to embodiments described herein.

FIG. 3 depicts a user interface 330 for creating a new grow cycle, according to embodiments described herein. As illustrated, the user interface 330 may be configured for receiving a new grow cycle. The user interface 330 may include at least one user option, such as a grow cycles option 332, a grow cycle details option 334, a light tree option 336, an input harvest data option 338, a reports option 340, a messages option 342, and a settings option 344. In response to selection of the grow cycles option 332, a listing of grow cycles to which the user has access may be provided, as described in more detail in FIG. 4. In response to selection of the grow cycle details option 334, additional details regarding one or more of the grow cycles may be provided, as described in more detail in FIG. 6. In response to selection of the light tree option 336, a depiction of the lighting and plant configuration may be provided, as described in more detail in FIG. 5. In response to selection of the input harvest data option 338 data regarding the progress of the plants may be provided. In some embodiments, the user may input this progress data, while other embodiments may receive sensor data to monitor this information.

Figure 7:
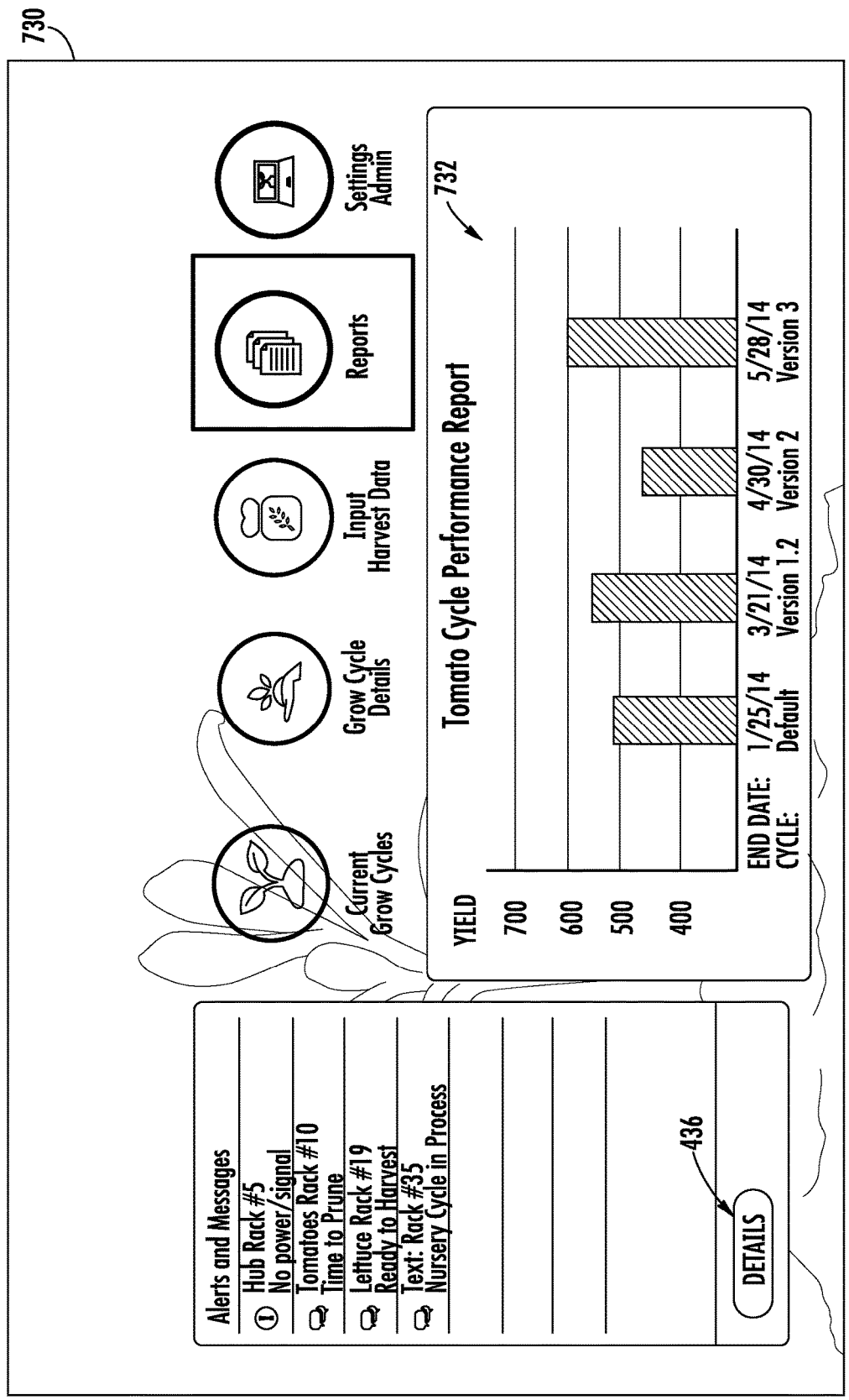
FIG. 7 depicts a user interface for providing performance reports, according to embodiments described herein.

In response to selection of the reports option 340 one or more reports may be provided, as described in more detail in FIG. 7. In response to selection of the messages option 342, one or more messages may be provided. In response to selection of the settings option 344, the user may be provided with settings for further configuring the grow lighting assembly 102 and/or other components described herein, as described in more detail in FIG. 8.

Also included are a view option 346 and a start new grow cycle option 348. In response to selection of the view option 346, the creating user may be provided with one or more different user interfaces for showing grow cycles that may be implemented for different plants, developmental stages, etc. In response to selection of the start new grow cycle option 348, the creating user may be provided with additional options for creating a new grow cycle.

As an example, the additional options may include a name option to create a name for the new grow cycle. Other options may include an option to identify a number, type, and location of the grow lighting devices 110. The creating user may additionally provide information regarding recommended types of plants, a number of plants, and a position of plants. Options for providing at least one lighting time (such as a first lighting time and a second lighting time) for at least one of the grow lighting devices 110 to illuminate, as well as providing cycle times for at least one of the grow lighting devices 110 to repeat a cycle of illumination of a grow cycle. The cycle time may be set for a predetermined number of minutes, hours, days, weeks, etc. such that the lighting times may change as the plant develops. Accordingly, embodiments may include options for the creating user to select that the lighting scheme changes when it is determined that a plant has reached a predetermined developmental stage. As such, each grow lighting device 110 may operate differently, based on the development of those plants. Some embodiments however operate such that at least a portion of the grow lighting devices 110 provide the same lighting for all plants of a common variety. Other options may also be provided for creating a grow cycle.

Once created, the grow cycle may be listed in the user interface 330 (and/or the user interface 430 from FIG. 4, described below). The grow cycle may include a name field, a location field, a start date field, a cycle field, an end date field, an input harvest field, a light task field, and a days until next task field. By selecting a previously created grow cycle, the user (either the creating user or other user) may view and/or amend the selected grow cycle.

Figure 4:
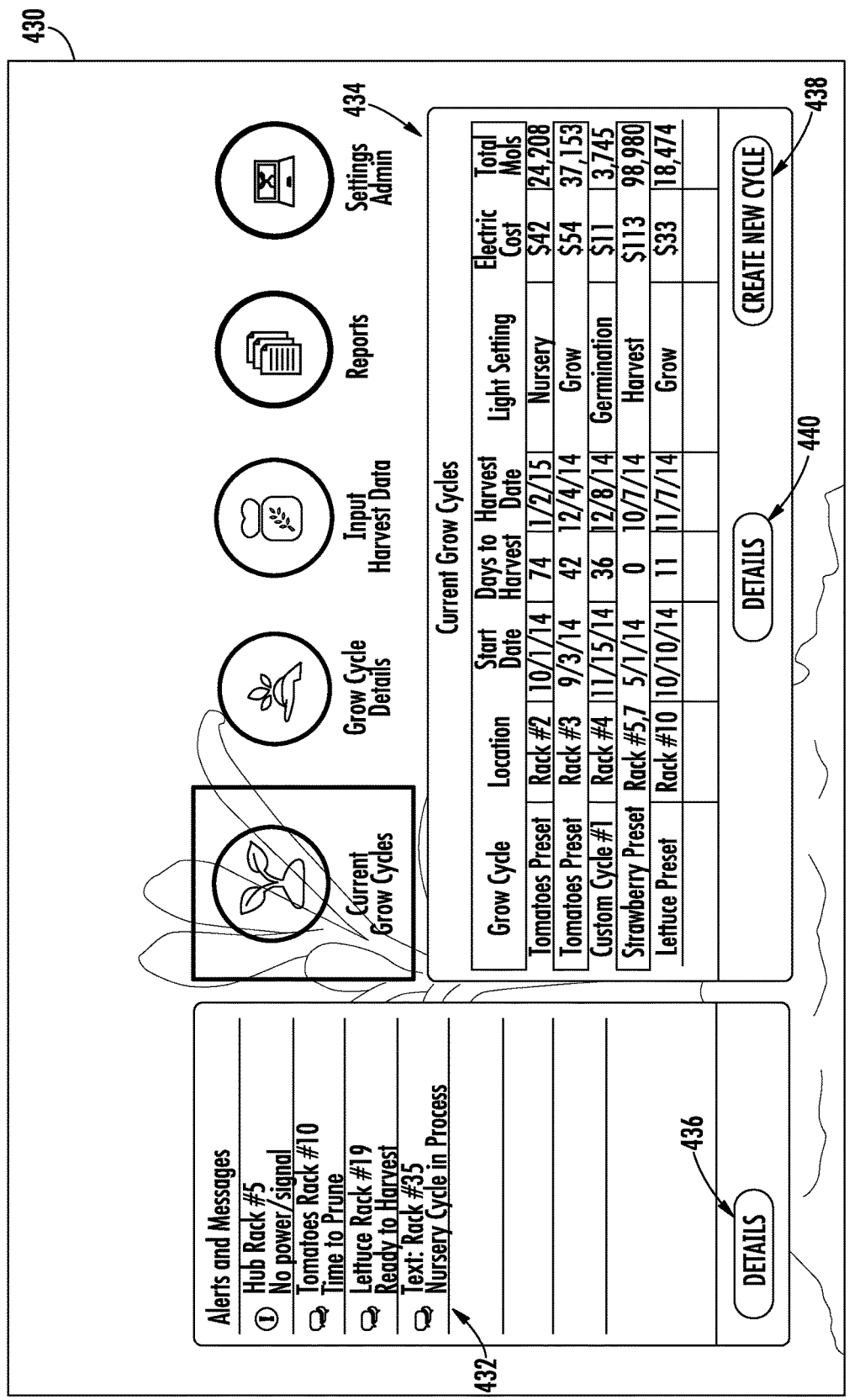
FIG. 4 depicts a user interface for providing current grow cycles, according to embodiments described herein.

FIG. 4 depicts a user interface 430 for providing current grow cycles, according to embodiments described herein. While the user interface 330 of FIG. 3 depicted options that are provided when no grow cycles have been created, the user interface 430 of FIG. 4 illustrates a plurality of grow cycles. Specifically, the user interface 430 includes an alerts section 432 and a cycles section 434. The alerts section 432 may be configured to provide a notification (e.g., alert and/or message) related to a grow lighting assembly 102, grow lighting device 110, an action to take for a particular developmental stage of a plant, and/or a plant to which a cycle is being applied. Accordingly, alerts may include a malfunction alert, a pruning reminder, a harvest reminder, a progress alert, a fertilizer reminder, a water reminder, and/or other alerts and messages. Selection of a details option 436 may provide additional details regarding the provided notifications.

The cycles section 434 may include a listing of cycles to which the user may be utilizing. These cycles may have been downloaded from a repository that was populated by a creating user who is an expert in the field of plant growth and/or may be created by any user via selection of a create new cycle option 438. In response to selection of a details option 440, details regarding a selected cycle may be provided.

Figure 5:
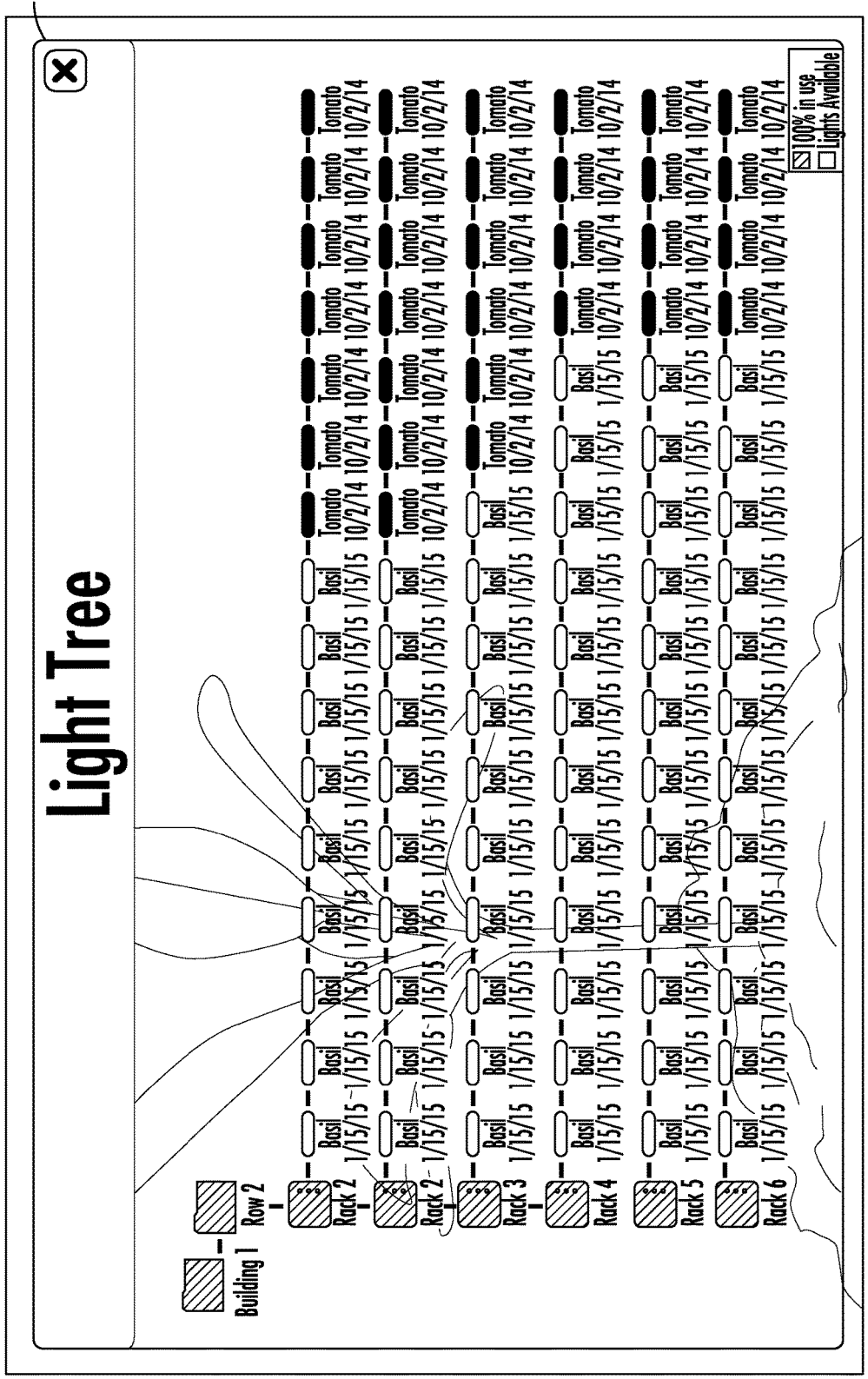
FIG. 5 depicts a user interface for providing a light tree, according to embodiments described herein.

FIG. 5 depicts a user interface 530 for providing a light tree, according to embodiments described herein. In response to selection of the light tree option 336 from FIG. 3, the user interface 530 may be provided. As illustrated, the user interface 530 provides a graphical depiction of plants and grow lighting devices 110 for a particular grow lighting assembly 102. The embodiment of FIG. 5 depicts that basil and tomato are being grown and, in response to selection of one of the plants information regarding the lighting cycle and developmental progress of the plant may be provided. In response to selection of one of the racks, information regarding the grow lighting devices 110 may be provided.

Figure 6:
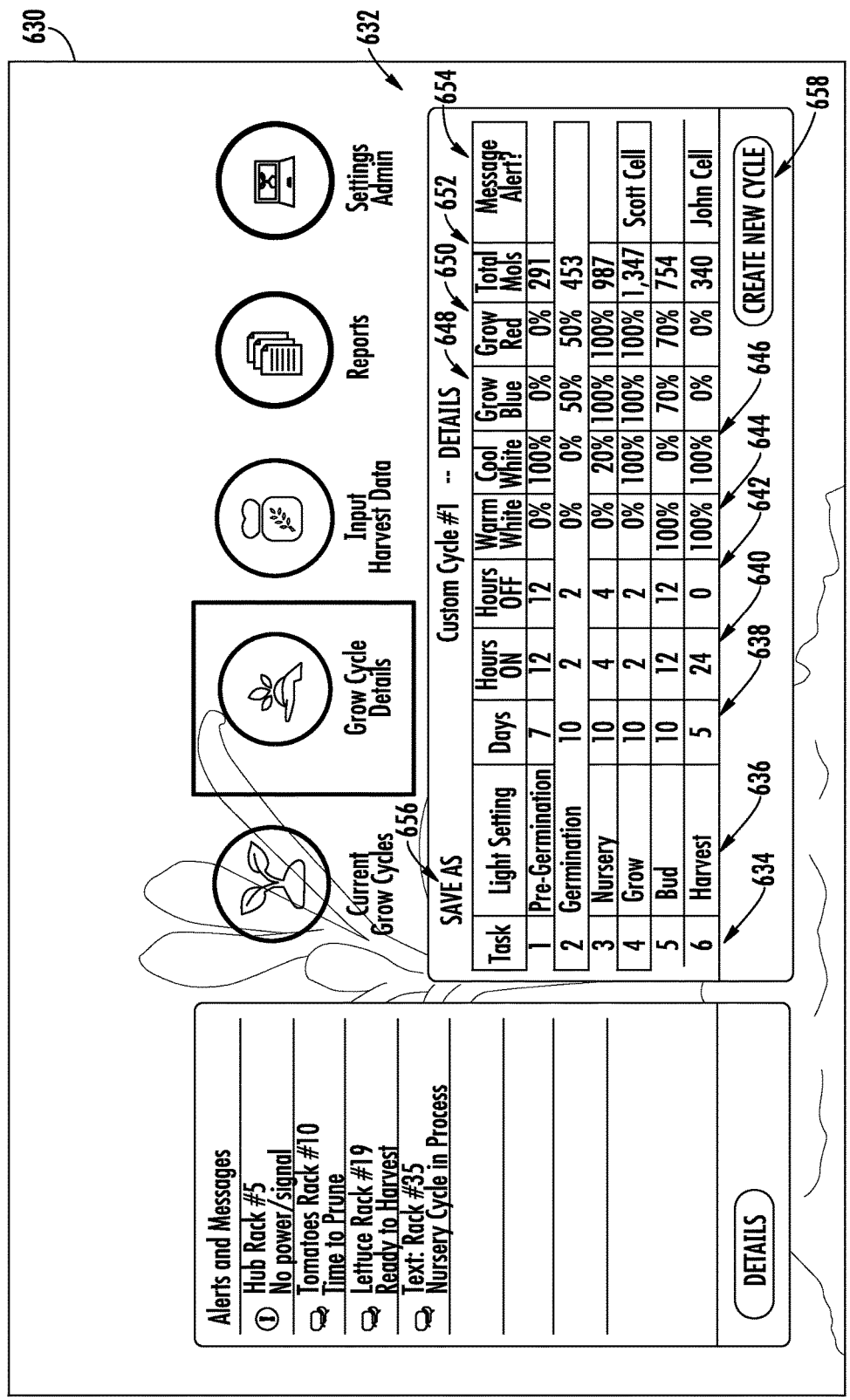
FIG. 6 depicts a user interface for providing grow cycle details, according to embodiments described herein.

FIG. 6 depicts a user interface 630 for providing grow cycle details, according to embodiments described herein. In response to selection of the grow cycle details option 334 from FIG. 3, the user interface 630 may be provided. As illustrated, the user interface 630 may include a details section 632, which includes a plurality of tasks for a grow cycle. Specifically, the details section 632 may include a task field 634, a light setting field 636, a days field 638, an on field 640, an off field 642, a warm white field 644, a cool white field 646, a grow blue field 648, a grow red field 650, a total mols field 652, and a message alert field 654. A save option 656 is also provided, as well as a create option 658.

FIG. 7 depicts a user interface 730 for providing performance reports, according to embodiments described herein. In response to selection of the reports option 340 from FIG. 3, the user interface 730 may be provided. The user interface 730 may include a reports section 732 for providing performance reports, lighting reports, and/or other reports. The user interface 730 illustrates a tomato cycle performance reports with a yield statistic that shows the tomato yield for a plant that has been subject to a plurality of cycles.

Figure 8:
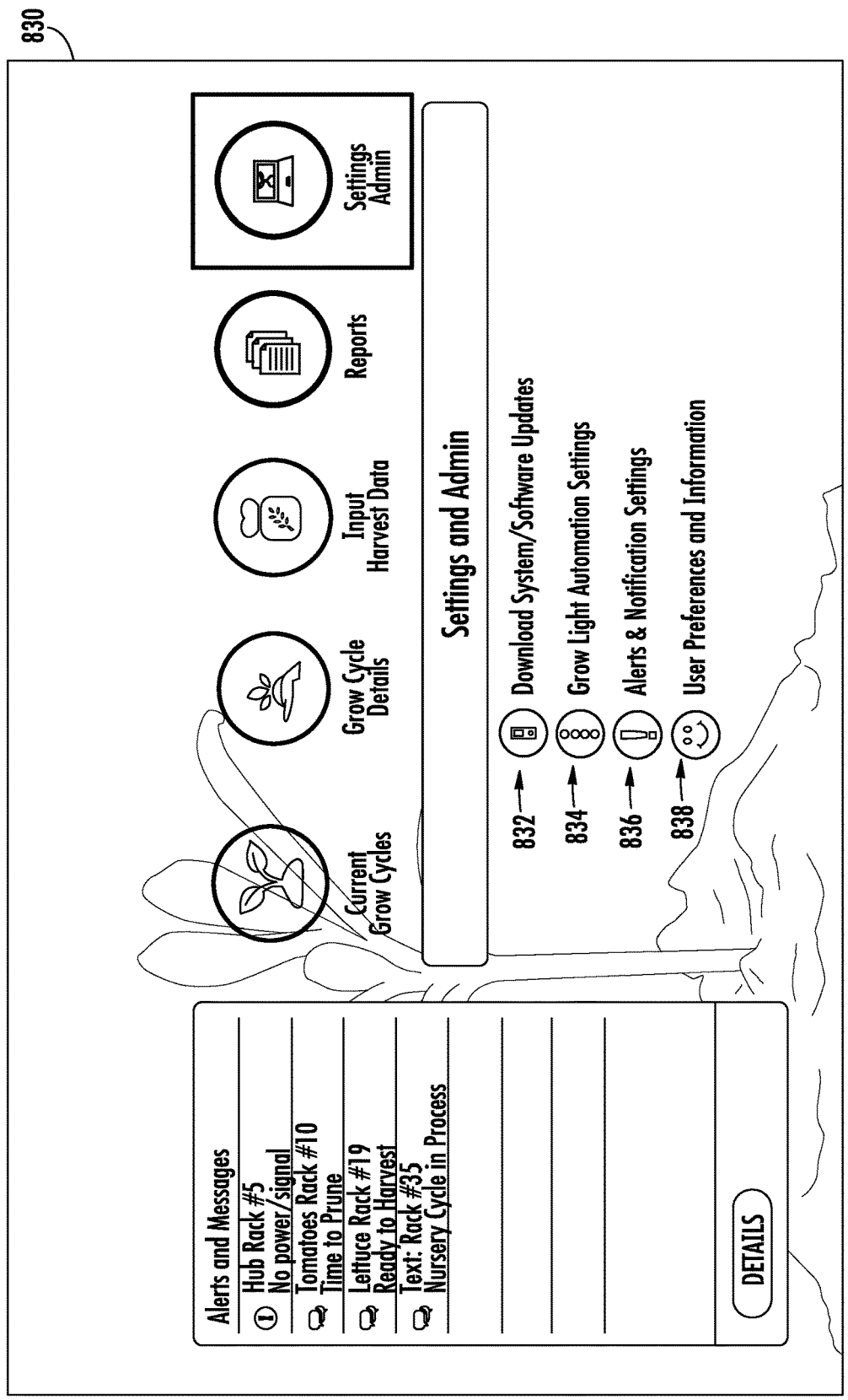
FIG. 8 depicts a user interface for providing administrative settings, according to embodiments described herein.

FIG. 8 depicts a user interface 830 for providing administrative settings, according to embodiments described herein. In response to selection of the settings option 344 from FIG. 3, the user interface 830 may be provided. As illustrated, the user interface 830 may include an updates option 832, an automation settings option 834, an alerts settings option 836, and a user preferences option 838.

Figure 9:
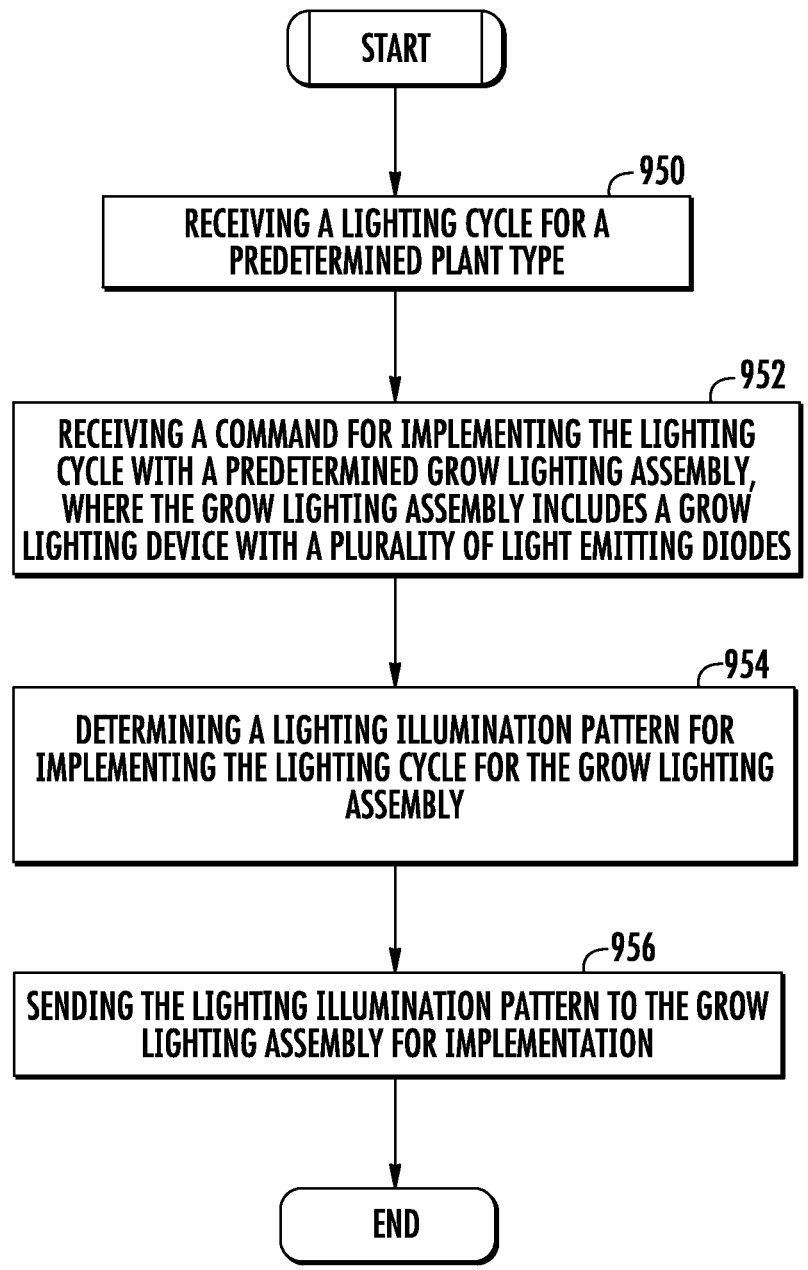
FIG. 9 depicts a flowchart for providing grow lighting, according to embodiments described herein.

FIG. 9 depicts a flowchart for providing grow lighting, according to embodiments described herein. As illustrated in block 950, a lighting cycle for a predetermined plant type may be received. In block 952, a command for implementing the lighting cycle with a predetermined grow lighting assembly 102 may be received, where the grow lighting assembly 102 includes a grow lighting device 110 with a plurality of light emitting diodes (and/or other low heat lighting elements). In block 954, an illumination pattern for implementing the lighting cycle for the grow lighting assembly 102 may be determined. In block 956 the illumination pattern (or plurality of different illumination patterns) may be sent to the grow lighting assembly 102 for implementation.

Figure 10:
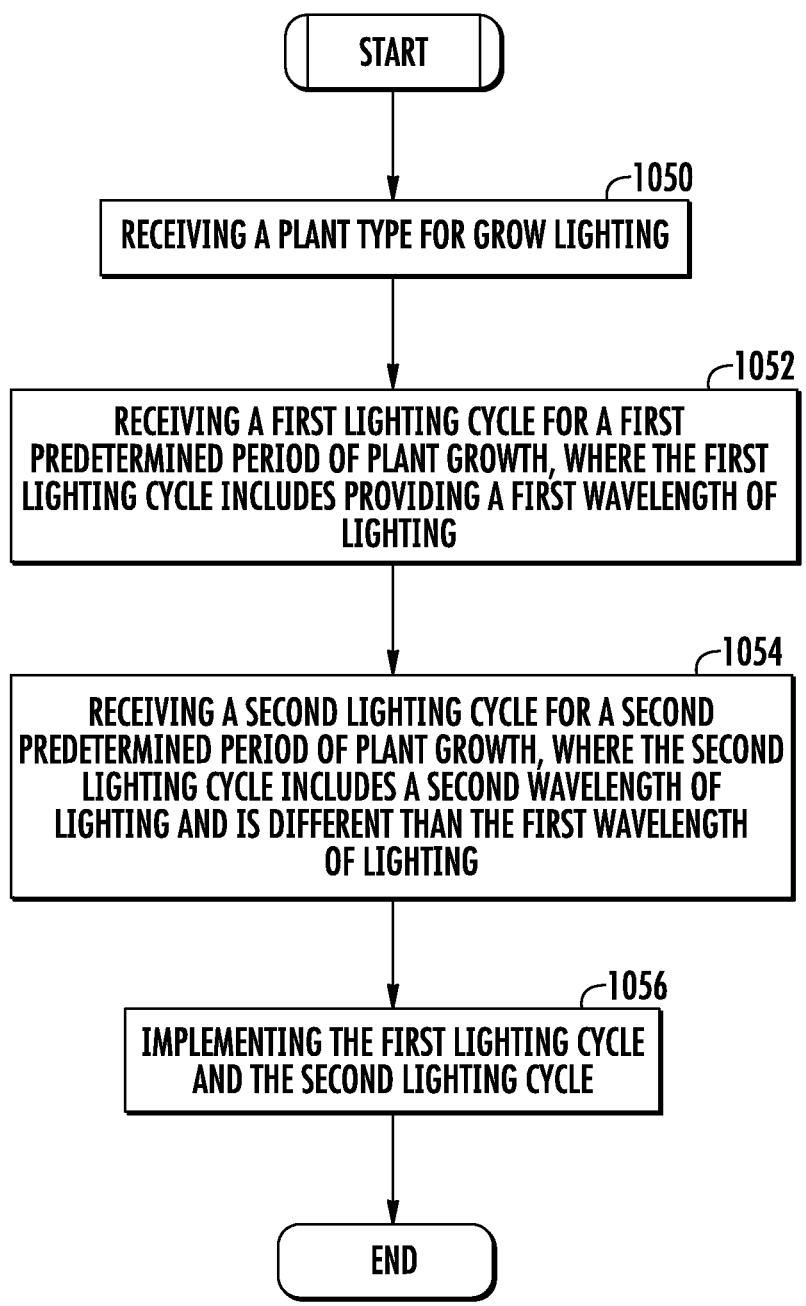
FIG. 10 depicts a flowchart for controlling grow lighting, according to embodiments described herein.

FIG. 10 depicts a flowchart for controlling grow lighting, according to embodiments described herein. As illustrated in block 1050, a plant type for grow lighting may be received. In block 1052, a first lighting cycle may be received for a first predetermined period of plant growth, where the first lighting cycle includes providing a first wavelength of lighting. In block 1054, a second lighting cycle may be received for a second predetermined period of plant growth, where the second lighting cycle includes a second wavelength of lighting and is different than the first wavelength of lighting. In block 1056, the first lighting cycle and the second lighting cycle are implemented.

Figure 11:
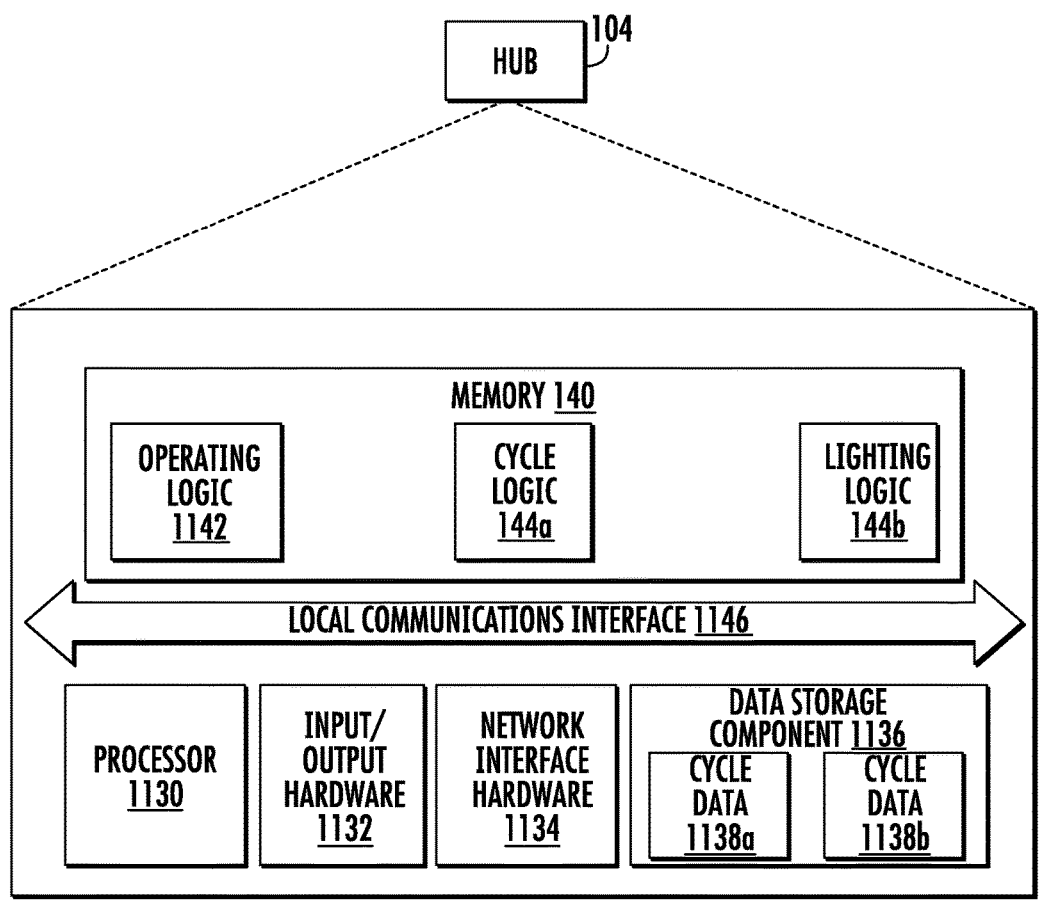
FIG. 11 depicts a computing infrastructure for providing grow lighting, according to embodiments described herein.

FIG. 11 depicts a computing infrastructure for providing grow lighting, according to embodiments described herein. The hub device 108 includes a processor 1130, input/output hardware 1132, network interface hardware 1134, a data storage component 1136 (which stores cycle data 1138a, lighting data 1138b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the hub device 108 and/or external to the hub device 108.

The memory component 140 may store operating system logic 1142, the cycle logic 144a and the lighting logic 144b. The cycle logic 144a and the lighting logic 144b may each include a plurality of different pieces of logic, each of which may be embodied as a computer program or module, firmware, and/or hardware, as an example. A local interface 1146 is also included in FIG. 11 and may be implemented as a bus or other communication interface to facilitate communication among the components of the hub device 108.

The processor 1130 may include any processing component operable to receive and execute instructions (such as from a data storage component 1136 and/or the memory component 140). As described above, the input/output hardware 1132 may include and/or be configured to interface with the components of FIG. 11.

The network interface hardware 1134 may include and/or be configured for communicating with any wired or wireless networking hardware, including an antenna, a modem, a LAN port, wireless fidelity (WiFi) card, WiMax card, mobile communications hardware, and/or other hardware for communicating with other networks and/or devices. From this connection, communication may be facilitated between the hub device 108 and other computing devices, such as those depicted in FIG. 1.

The operating system logic 1142 may include an operating system and/or other software for managing components of the hub device 108. As discussed above, the cycle logic 144a may reside in the memory component 140 and may be configured to cause the processor 1130 to determine one or more cycles that may be utilized for growing a predetermined plant. Similarly, the lighting logic 144b may be utilized to coordinate different grow lighting devices 110 for implementing the appropriate cycle.

It should be understood that while the components in FIG. 11 are illustrated as residing within the hub device 108, this is merely an example. In some embodiments, one or more of the components may reside external to the hub device 108. It should also be understood that, while the hub device 108 is illustrated as a single device, this is also merely an example. In some embodiments, the cycle logic 144a and the lighting logic 144b may reside on different computing devices. As another example, one or more of the functionalities and/or components described herein may be provided by the remote computing device 104, the user computing device 106, the lighting assembly 102, and/or other computing devices, which may be coupled to the hub device 108 via the network 100. These computing devices may also include hardware and/or software for performing the functionality described herein.

Additionally, while the hub device 108 is illustrated with the cycle logic 144a and the lighting logic 144b as separate logical components, this is also an example. In some embodiments, a single piece of logic may cause the hub to provide the described functionality.

As illustrated above, various embodiments for providing grow lighting are disclosed. As the grow lighting may be configured for programming of different wavelength light that provides different photons to the plants at different stages of development, plant growth may be optimized. Additionally, by utilizing LED or other low heat devices, the position of the grow lighting may be optimized based on the lighting needs of the plants.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for providing grow lighting. It should also be understood that these embodiments are merely exemplary and are not intended to limit the scope of this disclosure.

What is claimed is:

1. A system for providing grow lighting, comprising:
 a grow lighting assembly that comprises a plurality of low heat lighting elements, wherein a first lighting element of the plurality of low heat lighting elements outputs a first wavelength of photon-emitting light, and wherein a second lighting element of the plurality of low heat lighting elements outputs a second wavelength of photon-emitting light; and a computing device that stores logic that, when executed by the computing device, causes the system to perform at least the following:

provide a user interface for creating a lighting cycle, the user interface configured to receive a user selection of a plurality options applicable to the grow lighting assembly;

receive, via the user interface, first data for creating a first portion of a lighting cycle, wherein the first portion comprises activating the first lighting element to output the first wavelength of photon-emitting light;

receive, via the user interface, second data for creating a second portion of the lighting cycle, wherein the second portion comprises activating the second lighting element to output the second wavelength of photon-emitting light;

receive a lighting cycle for a predetermined plant type based at least in part on the received first data and the received second data;

receive, via the user interface, a command for implementing the lighting cycle with the grow lighting assembly on a plant;

determine an illumination pattern for implementing the lighting cycle for the grow lighting assembly;

send the illumination pattern to the grow lighting assembly for implementation, wherein the grow lighting assembly implements the illumination pattern;

provide one or more details of the illumination pattern to a user via the user interface, wherein the one or more details include a value of total mols;

provide a user option to edit the detail via the user interface; and provide a notification to harvest the plant based at least in part on a detected level of growth of the plant exceeding a configurable threshold.

2. The system of claim 1, wherein the computing device is configured as at least one of the following: a component of the grow lighting assembly, a hub device coupled to the grow lighting assembly, and a remote computing device.

3. The system of claim 1, wherein the plurality of low heat lighting elements comprises light emitting diodes (LEDs).

4. The system of claim 1, wherein the lighting cycle comprises a plurality of different illumination patterns, depending on a developmental stage of the plant.

5. The system of claim 1, wherein the logic further causes the system to perform at least the following:

determine an action to take regarding a developmental stage of the plant; and provide a notification regarding the action, wherein the notification comprises at least one of a malfunction alert, a pruning reminder, a progress alert, a fertilizer reminder, and a water reminder.

6. The system of claim 1, wherein the logic further causes the system to provide a user option to edit the lighting cycle.

7. The system of claim 1, wherein the logic further causes the system to perform at least the following:

receive, via the user interface, input related to the total mols provided by the lighting assembly; and modify the lighting cycle based at least in part on the received input related to the total mols provided by the lighting assembly.

8. A system for providing grow lighting, comprising:

a computing device that stores logic that, when executed by the computing device, causes the system to perform at least the following:

provide a user interface for creating a lighting cycle, the user interface configured to receive a user selection of a plurality options applicable to a grow lighting assembly;

receive, via the user interface, first data for creating a first portion of a lighting cycle, wherein the first portion comprises activating a first light emitting diode (LED) to output a first wavelength of photon-emitting light;

receive, via the user interface, second data for creating a second portion of the lighting cycle, wherein the second portion comprises activating a second LED to output a second wavelength of photon-emitting light that is different from the first wavelength;

receive a lighting cycle for a predetermined plant type based at least in part on the received first data and the second data;

receive, via the user interface, a command for implementing the lighting cycle with the grow lighting assembly on a plant, wherein the grow lighting assembly includes a grow lighting device with a plurality of LEDs;

determine an illumination pattern for implementing the lighting cycle for the grow lighting assembly;

send the illumination pattern to the grow lighting assembly for implementation;

provide one or more details of the illumination pattern to a user via the user interface, wherein the one or more details include a value of total mols; and provide a user option to edit the detail via the user interface.

9. The system of claim 8, wherein the illumination pattern includes illuminating the first LED having the first wavelength and the second LED having the second wavelength.

10. The system of claim 8, wherein the lighting cycle comprises a plurality of different illumination patterns, depending on a developmental stage of the plant.

11. The system of claim 8, wherein the logic further causes the system to perform at least the following:

determine an action to take regarding a developmental stage of the plant; and provide a notification regarding the action, wherein the notification is a notification to harvest the plant based at least in part on a detected level of growth of the plant exceeding a configurable threshold.

12. The system of claim 8, wherein the logic further causes the system to perform at least the following:

determine a yield statistic of the plant that has been subject to the lighting cycle; and provide the yield statistic to a user.

13. The system of claim 8, further comprising providing a user option to edit the lighting cycle.

14. The system of claim 8, wherein the logic further causes the system to perform at least the following:

receive, via the user interface, input related to the total mols provided by the lighting assembly; and modify the lighting cycle based at least in part on the received input related to the total mols provided by the lighting assembly.

15. A system for providing grow lighting, comprising:

a computing device that stores logic that, when executed by the computing device, causes the system to perform at least the following:

provide a user interface for creating a lighting cycle, the user interface configured to receive a user selection of a plurality options applicable to a grow lighting assembly;

receive, via the user interface, first data for creating a first portion of a lighting cycle, wherein the first portion comprises activating a first light emitting diode (LED) to output a first wavelength of photon-emitting light;

receive, via the user interface, second data for creating a second portion of the lighting cycle, wherein the second portion comprises activating a second LED to output a second wavelength of photon-emitting light that is different from the first wavelength;

receive a lighting cycle for a predetermined plant type based at least in part on the received first data and second data;

receive, via the user interface, a command for implementing the lighting cycle with the grow lighting assembly on a plant, wherein the grow lighting assembly includes a grow lighting device with a plurality of LEDs, wherein the plurality of LEDs comprises the first LED and the second LED;

determine an illumination pattern for implementing the lighting cycle for the first LED and the second LED;

send the illumination pattern to the grow lighting assembly for implementation;

provide one or more details of the illumination pattern to a user via the user interface, wherein the one or more details include a value of total mols;

provide a user option to edit the detail via the user interface; and provide a notification to harvest the plant based at least in part on a detected level of growth of the plant exceeding a configurable threshold.

16. The system of claim 15, wherein the lighting cycle comprises a plurality of different illumination patterns, depending on a developmental stage of the plant.

17. The system of claim 15, wherein the logic further causes the system to perform at least the following:

determine an action to take regarding a developmental stage of the plant; and provide a notification regarding the action, wherein the notification comprises at least one of aa malfunction alert, a pruning reminder, a progress alert, a fertilizer reminder, and a water reminder.

18. The system for providing grow lighting of claim 15, wherein the user option comprises an option to edit the number of days the determined illumination pattern is used.

19. The system of claim 15, wherein the logic further causes the system to perform at least the following:

receive, via the user interface, input related to the total mols provided by the lighting assembly; and modify the lighting cycle based at least in part on the received input related to the total mols provided by the lighting assembly.

* * * * *